United States Patent [19]
Ryan

[11] Patent Number: 4,907,503
[45] Date of Patent: Mar. 13, 1990

[54] REMOVABLE TOOTH CAP FOR USE ON THE ROTOR OF AN AGRICULTURAL FEED BAGGER

[76] Inventor: Kelly P. Ryan, P.O. Box 488, Blair, Nebr. 68008

[21] Appl. No.: 314,804

[22] Filed: Feb. 24, 1989

[51] Int. Cl.⁴ .................. A01F 25/16; B65G 3/04; B30B 5/00; B65B 1/04
[52] U.S. Cl. ................... 100/65; 100/144; 100/177; 56/344; 141/114
[58] Field of Search ........... 100/65, 66, 144, 177, 100/189; 141/114, 71, 73, 80, 10; 56/364, 344, 400.02; 366/307, 319, 81

[56] References Cited

U.S. PATENT DOCUMENTS

| Re. 31,810 | 1/1985 | Lee | 100/65 X |
|---|---|---|---|
| 3,182,633 | 5/1965 | Lodige et al. | 366/307 X |
| 3,498,762 | 3/1970 | Vander Schee et al. | 366/307 X |
| 4,337,805 | 7/1982 | Johnson et al. | 141/114 X |
| 4,621,666 | 11/1986 | Ryan | 141/114 |
| 4,653,553 | 3/1987 | Cox et al. | 100/65 X |
| 4,658,717 | 4/1987 | Juhuku | 100/144 X |
| 4,688,480 | 8/1987 | Ryan | 100/144 |
| 4,724,876 | 2/1988 | Ryan | 141/114 |

Primary Examiner—Harvey C. Hornsby
Assistant Examiner—Stephen F. Gerrity
Attorney, Agent, or Firm—Zarley, McKee, Thomte, Voorhees & Sease

[57] ABSTRACT

A removable tooth cap for use on the rotor of an agricultural feed bagger comprising a pusher plate selectively movably secured to each of the teeth on the rotor. The inner end of each of the pusher plates are removably received in an elongated opening formed in the leading edge of the associated rotor tooth. The outer end of each of the pusher plates embrace a portion of the outer end of the associated rotor tooth.

3 Claims, 3 Drawing Sheets

REMOVABLE TOOTH CAP FOR USE ON THE ROTOR OF AN AGRICULTURAL FEED BAGGER

TECHNICAL FIELD

This invention relates to an apparatus for loading compressible, agricultural feed stock into expandable storage bags.

BACKGROUND OF THE INVENTION

Horizontally expandable, silage storage bags are commonly used as an alternative to permanent feed storage structures such as barns and silos. From an economic standpoint, the expandable storage bag is preferable to a more elaborate, permanent structure. Further, the expandable bags are more easily loaded than permanent structures and the silage stored therein is readily accessible for use.

An exemplary prior art structure is disclosed in Reissue U.S. Pat. No. 31,810 to Lee. A tractor-powered loading apparatus is disclosed in association with an expandable bag. A backstop is located at the filled end of the bag and has attached thereto laterally spaced cables which extend back to rotatable cable drums. The drums are yieldably braked and, under a predetermined force applied to the cables, release the cable to allow movement of the loading apparatus and tractor away from the filled end of the bag. The bag is filled by a toothed rotor which propels silage through the bag inlet. By presetting the brake structure to yield at a desired cable tension, an operator can select the degree of compaction of silage in the bag.

One drawback with the prior art is that rotor structure, such as shown in Lee, is inefficient. In a conventional apparatus, a rotor body carries a plurality of axially-spaced blades or teeth. The planes of the teeth run parallel to the direction of rotation of the rotor. Consequently, only the leading edges of the teeth engage and propel the silage. To effectively move the silage, the teeth must be placed close together. This requires the provision of a substantial number of teeth, which adds to the weight and cost of manufacturing the rotor. Even with the teeth closely spaced, with silage that is dry and fine, movement of the silage through the rotor may be ineffective.

In applicant's earlier U.S. Pat. No. 4,688,480, an improved pushing plate or tooth cap was described for use on each of the teeth on the rotors. The instant invention relates to an improved means for quickly and easily mounting the caps or pusher plates on the rotor teeth with the same also being easily removable therefrom when the caps become worn.

SUMMARY OF THE INVENTION

The present invention is specifically directed to improve upon the structure disclosed in applicant's earlier U.S. Pat. No. 4,688,480.

The teeth of the rotor are modified to create elongated openings extending into each of the teeth from the leading edge thereof outwardly of the inner ends of the teeth. An arcuate cap having opposite ends is detachably secured to the tooth by inserting one end of the cap into the elongated opening in the leading edge of the tooth and causing the other end of the cap to yieldably embrace the outer end of the tooth. The positioning of one end of the cap in the elongated opening and the engagement of the outer end of the cap with the outer end of the tooth causes the cap to be selectively removably positioned on the tooth. Means is also provided for preventing the lateral movement of the cap with respect to the tooth.

When it is desired to remove the cap from the tooth, a hammer or sledge is used to disengage the outer end of the cap from the outer end of the tooth thereby permitting the cap to be removed from a tooth with a new cap then being able to be placed on the tooth.

DESCRIPTION OF THE PREFERRED EMBODIMENT

Figure 1:
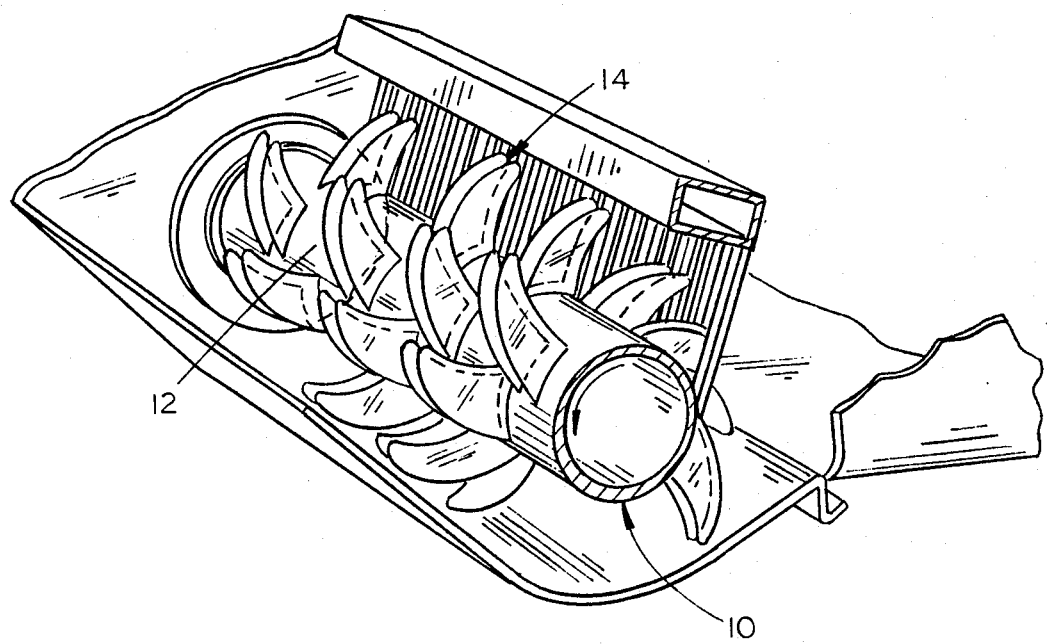
FIG. 1 is a partial perspective view illustrating a conventional rotor having rotor teeth mounted thereon.
Figure 2:
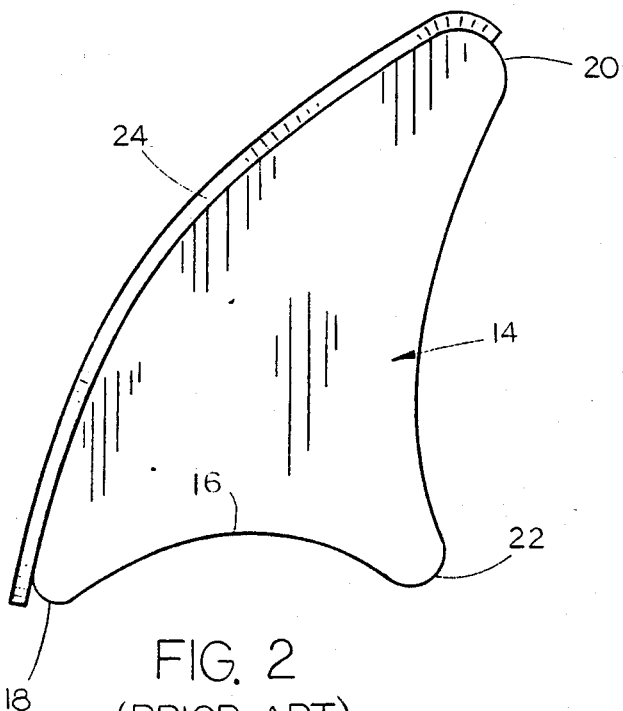
FIG. 2 is a side view of a rotor tooth having a tooth cap thereon.
Figure 3:
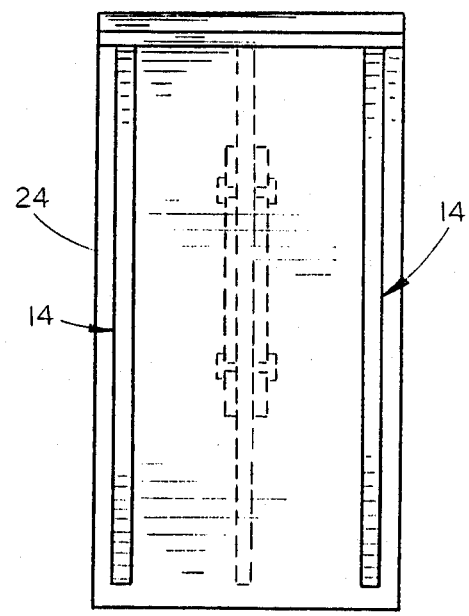
FIG. 3 is an elevational view of a prior art tooth cap.

A typical prior art rotor is illustrated in FIG. 1 and a side view of a rotor tooth having applicant's pusher plate or cap mounted thereon such as illustrated in U.S. Pat. No. 4,688,480 is illustrated in FIG. 2. FIG. 3 is an elevation view of the tooth cap of the '480 patent.

The numeral 10 refers generally to a conventional rotor including a cylindrical drum 12 having a plurality of rotor teeth 14 mounted thereon. Each of the teeth 14 have an inner end 16 that is curved to conform to the drum 12 and welded thereto The teeth 14 each have an overall triangular configuration, with each of the apexes 18, 20 and 22 being rounded to prevent hang-up of material thereon. For purposes of description, tooth 14 will be described as having a leading edge 24 with apex 18 being the inner end of the leading edge and the apex 20 being the other end of the leading edge.

With respect to the three embodiments illustrated in FIGS. 4-8, the numeral 14A refers to the first embodiment, the numeral 14B referring to the second embodiment and the numeral 14C referring to the third embodiment. In each of those embodiments, the letters A, B, C, will be used to designate tooth structure on that particular embodiment.

Figure 4:
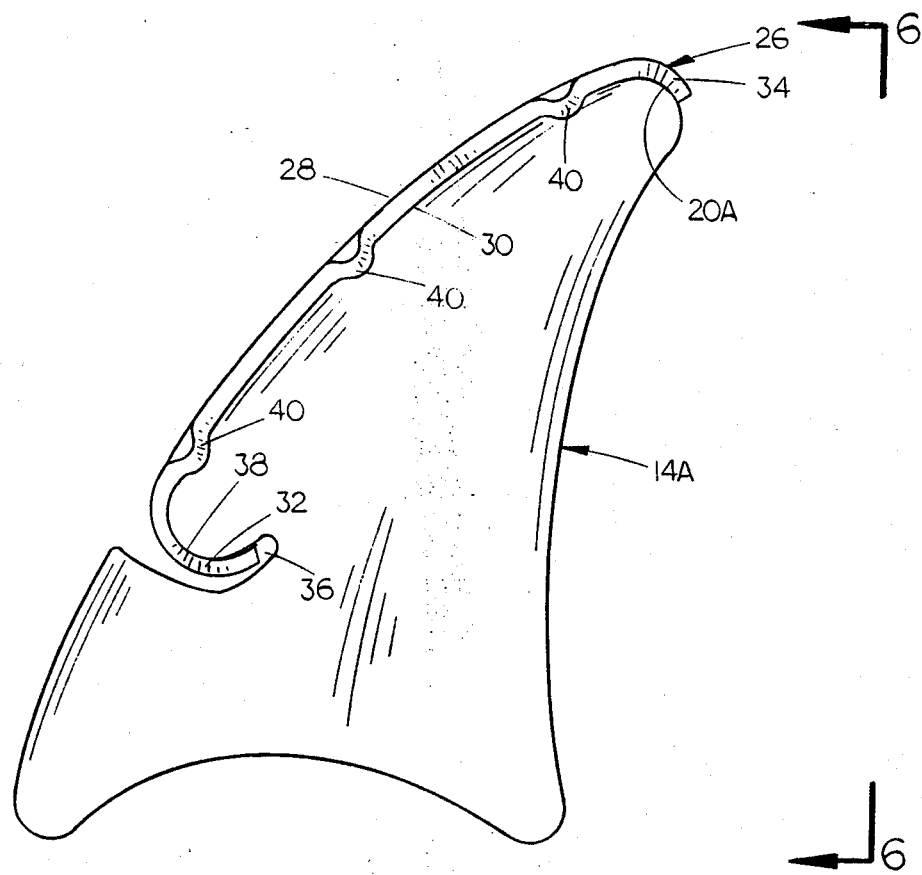
FIG. 4 is a side view of one form of the tooth cap of this invention.
Figure 5:
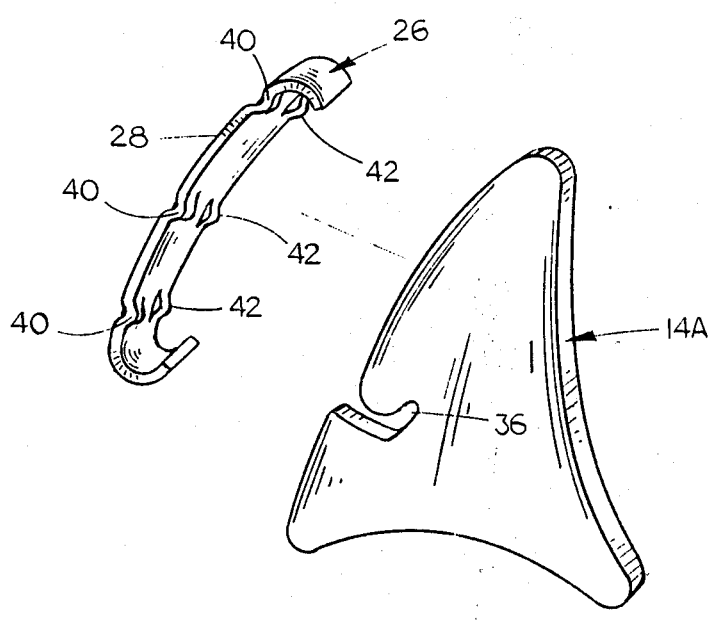
FIG. 5 is an exploded perspective view of the tooth cap of FIG. 4.
Figure 6:
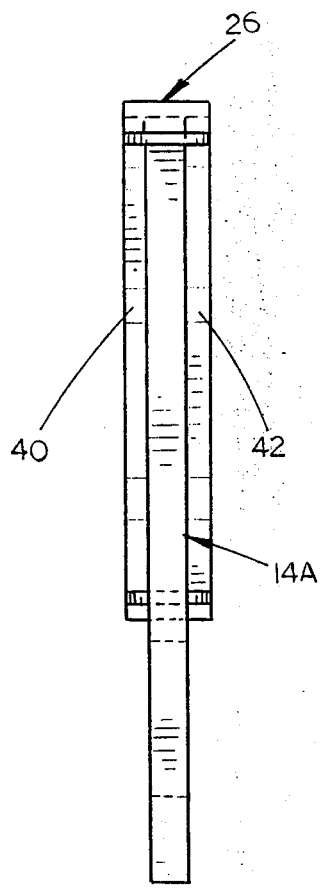
FIG. 6 is a rear view of the tooth cap of FIG. 5.

Embodiment 14A is illustrated in FIGS. 4-6. In FIGS. 4-6, the numeral 26 refers to a pusher plate or tooth cap having a leading pushing surface 28 and a trailing back surface 30. Cap 26 also includes an arcuate inner end portion 32 and an arcuate outer portion 34. As seen in the drawings, tooth 14A is provided with an elongated arcuate opening 36 formed therein which defines a shoulder 38.

Cap 26 is secured to tooth 14A by first inserting the arcuate end 32 into the opening 36 and then causing the arcuate end 34 to yieldably embrace apex 20A. The cap 26 is preferably constructed of a steel material having sufficient resiliency so that when the arcuate portion 34 is embracing the apex 20A, the cap will remain on the tooth through the cooperation of the arcuate portions 32 and 34 engaging shoulder 38 and apex 20A respectively, as illustrated in the drawings. Preferably, cap 26 is also provided with a plurality of spaced shoulders 40 along one side thereof and a plurality of spaced shoulders 42 along the other side thereof which are adapted to engage opposite sides of the tooth 14A as illustrated in the drawings to prevent lateral movement of the cap 26 with respect to the tooth 14A. When it is desired to remove cap 26 from tooth 14A, the free end of arcuate portion 34 of cap 26 is struck with a hammer or the like to dislodge arcuate portion 34 from apex 20A.

Figure 7:
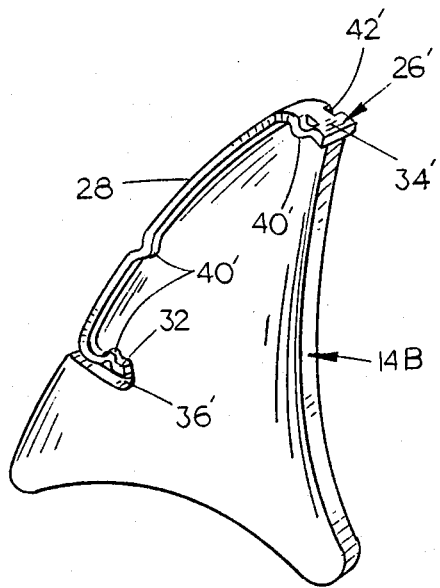
FIG. 7 is a perspective view of a modified form of the invention.

The embodiment of the tooth cap illustrated in FIG. 7 is essentially identical to the embodiment illustrated in FIGS. 4–6 except for the elongated opening 36' being somewhat different shaped than opening 36 and for the fact that the cap 26' is provided with the shoulders 40' and 42' adjacent the ends of the arcuate portions 32' and 34', respectively.

Figure 8:
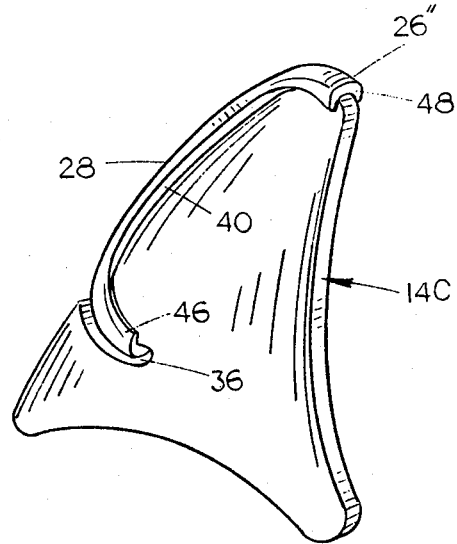
FIG. 8 is a perspective view of yet another modified form of the invention.

The embodiment of the invention illustrated in FIG. 8 is essentially identical to the embodiment illustrated in FIGS. 4–6 except that the shoulders 40 and 42 have been eliminated in the embodiment of the cap which is utilized on tooth 14C. In FIG. 8, it can be seen that the cap 26" does not have shoulders 40 and 42 but is provided with "channel" portions 46 and 48 at its opposite ends which embrace the tooth to prevent lateral movement of the cap 26" with respect to the tooth 14C.

I claim:

1. In an apparatus for loading feed stock into an agricultural bag having an inlet for introduction of the feed stock, said apparatus having a rotor with a rigid, generally cylindrical body having a rotational axis, a plurality of teeth fixedly attached directly to the rotor body and having a width in the axial direction of the rotor body, said teeth picking up and propelling feed stock generally radially with respect to the rotor body through the bag inlet as the rotor is operated, the improvement comprising:

a pusher plate means selectively removably secured to each of said teeth, each of said pusher plate means having inner and outer ends, a front pushing surface, and a trailing back surface, each of said teeth having a convex leading edge with inner and outer ends, each of said teeth having an elongated opening formed therein which extends into the leading edge thereof outwardly of the inner end thereof, the inner end of said pusher plate means being selectively removably received by said opening in the associated tooth and the outer end of said pusher plate means at least partially yieldably embracing the outer end of the associated tooth to cooperate to selectively maintain said pusher plate means on said tooth, said pusher plate means having a width greater than the width of the associated tooth.

2. The apparatus of claim 1 wherein said pusher plate means has spaced-apart shoulders provided thereon which embrace opposite sides of the associated tooth to limit the lateral movement of the pusher plate means with respect to the tooth.

3. The apparatus of claim 1 wherein said pusher plate means has channel portions at its opposite ends which embrace said associated tooth to prevent lateral movement of the pusher plate with respect to the associated tooth.

* * * * *